United States Patent [19]

Takahashi

[11] 4,003,962
[45] Jan. 18, 1977

[54] METHOD OF PREPARING AN EASY PROCESSING POLYVINYL HALIDE BY AN IN-PROCESS REACTION
[75] Inventor: Akio Takahashi, Amherst, N.Y.
[73] Assignee: Hooker Chemicals & Plastics Corporation, Niagara Falls, N.Y.
[22] Filed: Feb. 24, 1975
[21] Appl. No.: 552,583

Related U.S. Application Data
[63] Continuation-in-part of Ser. No. 318,781, Dec. 27, 1972, abandoned.
[52] U.S. Cl. .......................... 260/884; 260/878 R; 260/879; 260/881; 526/271
[51] Int. Cl.$^2$ ....................................... C08L 27/00
[58] Field of Search ....... 260/884, 879, 881, 878 R
[56] References Cited
UNITED STATES PATENTS

| 2,483,960 | 10/1949 | Baer | 260/884 |
| 3,475,361 | 10/1969 | Garner | 260/884 |
| 3,645,939 | 2/1972 | Gaylord | 260/884 |
| 3,887,653 | 6/1975 | Konishi et al. | 260/884 |

Primary Examiner—J. Ziegler
Attorney, Agent, or Firm—Peter F. Casella; James F. Mudd; David A. Stein

[57] ABSTRACT

An easy processing polyvinyl halide polymer can be made by a process of reacting a vinyl ester and maleic anhydride with said vinyl halide polymer to produce a branched chain graft copolymer in which the monomeric vinyl ester and maleic anhydride are graft copolymerized onto the polyvinyl chloride backbone. Such a reaction can take place during processing of the polyvinyl chloride homopolymer on such equipment as Banbury mixers, injection molders, extruders and two-roll mills. The process is readily accomplished generally involving no more than the usual processing time involved to incorporate fillers, plasticizers and stabilizers into the polyvinyl halide homopolymer. The products of the invention are more readily processable without decomposition by thermal means and can be cross-linked into rigid products by the reaction of the grafted anhydride group in the product with such cross-linking agents as polyfunctional alcohols, amines, epoxides, and isocyanates.

14 Claims, No Drawings

METHOD OF PREPARING AN EASY PROCESSING POLYVINYL HALIDE BY AN IN-PROCESS REACTION

CROSS-REFERENCE TO PRIOR APPLICATION

This is a continuation-in-part of copending application Ser. No. 318,781, filed Dec. 27, 1972, now abandoned.

BACKGROUND OF THE INVENTION

1. Field of the Invention

This invention relates to the preparation of easy processing, cross linking graft copolymers of a polyvinyl halide such as a polyvinyl chloride polymer having improved thermal processability, improved solubility in organic solvents, improved adhesion to organic and inorganic surfaces. The branched chain graft copolymers of the invention are useful in the production of films, coatings and molded articles. The products can be produced using the usual polyvinyl halide processing equipment.

As is well known graft polymers can be prepared by reacting a monomer or monomers onto a polymer chain so that the graft polymer product contains a branched chain structure. Such graft polymers differ from straight chain terpolymers prepared by reacting only monomers in admixture.

It is known to produce straight chain vinyl halide terpolymers such as a terpolymer of vinyl chloride, vinyl acetate and maleic acid, by emulsion and suspension polymerization processes. Such products show improved processability over polyvinyl chloride homopolymers, improved adhesion to organic or inorganic surfaces, increased solubility in organic solvents and are produced by conventional polymerization processes in which maleic anhydride is not used but rather maleic acid. Such systems show far less reactivity than the graft polymerization process of the invention in which maleic anhydride is used. These methods of producing straight chain terpolymers result in very slow reactivity of the monomers and thus a reasonable conversion rate from aqueous, emulsion, suspension or solution systems cannot be obtained with desirable economy. In addition, such straight chain terpolymers based upon maleic acid are not readily cross-linkable so as to obtain polymers having reduced organic solvent solubility. By contrast, the graft polymers of the invention can be readily cross-linked since the anhydride group of the branched chain terpolymer of the invention can be reacted with cross-linking agents.

2. Description of the Prior Art

In U.S. Pat. No. 2,147,154 there is claimed a method of producing a straight chain polymerization product of vinyl chloride by emulsion polymerizing said vinyl chloride with 0.5 to 3 percent of an alpha, beta-unsaturated carboxylic acid. It is disclosed that vinyl chloride can be polymerized alone or in admixture with vinyl esters such as acrylic acid esters, acrylic acid, nitriles, or styrene. The polymerization can be conducted in mass. The emulsion polymerized product is subsequently treated with a strongly alkaline material in a liquid medium adjusted to a pH of 7.5 to 12.

U.S. Pat. No. 2,462,422 relates to the emulsion polymerization of a straight chain polymer comprising vinyl chloride, vinyl acetate, and maleic anhydride.

The object of the present invention is to develop a process for the preparation of branched chain polymers and copolymers of vinyl halide which would be extremely rapid even at moderate temperatures. It is apparent that water present in an aqueous graft or suspension graft polymerization system would decompose the maleic anhydride to maleic acid and thereby result in a slower rate of polymerization than can be obtained in the bulk process of graft polymerization disclosed in the instant invention.

SUMMARY OF THE INVENTION

This invention relates to a method of graft polymerization of a vinyl halide polymer by contacting the polymer with a vinyl ester in combination with maleic anhydride on conventional processing equipment for polyvinyl halide at a temperature from about 150° to about 180° centigrade in the presence of a free radical initiator. Such copolymers show improved solubility in organic solvents and exhibit and property of improved adhesion to organic and inorganic surfaces as compared to the conventional vinyl halide polymer. The graft copolymers of the invention can be readily cross-linked with polyfunctional alcohols, amines, epoxides and isocyanates as a result of the presence of the anhydride group on the polymer chain. The branched chain graft copolymers of the invention as a result of grafting are internally plasticized so that the graft copolymers show improved thermal processability without decomposition or discoloration as a result of the fact that the graft copolymers can be processed at lower temperatures in comparison with polyvinyl halide polymers having comparable physical properties.

DESCRIPTION OF THE PREFERRED EMBODIMENTS

The easy processing branched chain polyvinyl halide graft copolymers of the invention can be produced by a reaction on conventional processing equipment during the processing of polyvinyl halide so as to include fillers, plasticizers, pigments and stabilizers. The time involved for the reaction is usually between about 5 minutes to about 30 minutes and corresponds to the time usually involved in incorporating additives into a polyvinyl halide polymer. The proportion of vinyl ester and maleic anhydride to vinyl halide polymer is from about 3 to about 30 percent by weight to about 95 to about 70 percent by weight of polyvinyl halide polymer. Preferably about 5 to about 15 percent by weight of vinyl ester and maleic anhydride is used. The proportion of maleic anhydride to vinyl ester used is in the molar ratio of about 0.1 to about 1, i.e., $$\frac{\text{maleic anhydride (mol)}}{\text{vinyl ester (mol)}} = 0.1 \text{ to about } 1.$$

The vinyl ester can have from about 6 to about 18 carbon atoms in the ester group and is a vinyl ester which boils at a temperature of 150°centigrade or higher. The vinyl ester monomers comprise esters of vinyl alcohol, such as vinyl laurate, vinyl butyrate, vinyl stearate, vinyl acetate and vinyl propionate. Generally, the larger the carbon atom of the side chain ester group, the higher the internal plasticizing effect on the polyvinyl chloride.

The mixing equipment utilized for compounding and processing polyvinyl halide polymers can be used in the process of the invention. Mixing equipment includes such mixers as Banbury mixers, Brabender Plasticorder, injection molders of various types, extruding machines of various types, and two-roll mills. The reaction occurs within the mixing equipment while the polyvinyl halide is being compounded with various plasticizers, pigments, etc., subsequent to the addition of the vinyl ester and maleic anhydride and upon addition of the free radical initiator. The reaction is carried out at elevated temperatures preferably from about 150° centigrade to about 180° centigrade, which corresponds to the molten phase of the reactants. The time involved in the reaction is somewhat dependent upon the efficiency of the mixing equipment. With equipment providing high shear forces, mixing is much more uniform and is accomplished with greater speed than with equipment only capable of low shear action. As a result, the time for the graft reaction can vary with the efficiency of the mixing equipment, but the time can be stated as generally between about 5 minutes and about 30 minutes after the components have reached the molten state and the free radical initiator has been added. Generally, a time of about 10 to about 15 minutes subsequent to the addition of the free radical initiator to the molten ingredients is sufficient for accomplishing the graft reaction.

The free radical initiator useful in the invention should have a half life of about 5 minutes to 5 hours at a temperature of about 150 to 180° centigrade. The proportion of free radical initiator used is from about 0.01 to about 1.0 part based on 100 parts of the vinyl halide polymer. Examples of free radical initiators useful in the invention are tertiary butyl perbenzoate, dicumyl peroxide, ditertiary butyl peroxide and azo catalysts such as 2-t-butylazo-2,4-dimethoxy-4-methylpentane, 2-t-butylazo-1,1-diethoxycarbonyl-2,4-dimethylpentane and 1-t-butylazo-1-methoxycyclohexane. The graft reaction is preferably carried out in the presence of up to 3% stabilizer based on 100 parts of polyvinyl chloride. The stabilizer is generally added during the processing of the polyvinyl chloride. Examples of such stabilizers useful in the invention are dibutyl tin dilaurate, dibutyl tin maleate dioctyl tin mercaptoacetate and calcium-zinc stabilizers, The process is directed primarily to polyvinyl halide homopolymer prepared by any of the known systems of polymerization, but copolymers of vinyl halide with other ethylenically unsaturated monomers can also be used. Suitable vinyl halide monomers useful in the invention are the alpha-halo-substituted ethylenically unsaturated compounds which are capable of entering into an addition polymerization reaction, for example, vinyl fluoride, vinyl chloride, vinyl bromide, vinyl iodide, vinylidene fluoride, vinylidene chloride, vinylidene bromide, vinylidene iodide and the like, although vinyl chloride is preferred. The polymers of the present invention can be formed of the same or different alpha-halo-substituted ethylenically unsaturated materials, and, thus, the invention includes homopolymers and copolymers including terpolymers, and interpolymers formed by addition polymerization. Illustrative of these copolymers is a copolymer of vinyl chloride and vinylidene chloride.

While it is preferred that the monomer composition be comprised totally of vinyl halide monomer as described above, the present invention is also intended to include copolymers formed by the free-radical addition polymerization of a monomer composition containing a predominant amount, e.g., at least 50 percent by weight of vinyl halide and a minor amount, e.g., up to 50 percent by weight of another ethylenically unsaturated monomer composition copolymerizable therewith. Preferably, the other ethylenically unsaturated monomer is used in amounts of 20 percent or less by weight and more preferably in amounts of 10 percent or less by weight of the total monomer used in preparing the polymer. Suitable ethylenically unsaturated compounds which can be used to form copolymers, including terpolymers and interpolymers and the like, are illustrated by the following monoolefinic hydrocarbons, i.e., monomers containing only carbon and hydrogen, including such materials as ethylene, propylene, 3-methylbutene-1, 4-methylpentene-1, pentene-1, 3,3-dimethylbutene-1,4,4-dimethylbutene-1, octene-1, decene-1, styrene and its nuclear alpha-alkyl or aryl substituted derivatives, e.g., o-, m- or p-methyl, ethyl, propyl or butyl styrene; alphamethyl, ethyl, propyl or butyl styrene; phenyl styrene, and halogenated styrenes such as alpha-chlorostyrene; monoolefinically unsaturated esters including vinyl esters of about 6 to about 18 carbon atoms in the ester group, e.g., vinyl acetate, vinyl propionate, vinyl butyrate, vinyl stearate, vinyl benzoate, vinyl-p-chlorobenzoates, alkyl methacrylates, e.g., methyl, ethyl, propyl and butyl methacrylate; octyl methacrylate, alkyl crotonates, e.g., octyl; alkyl acrylates, e.g., methyl, ethyl, propyl, butyl, 2-ethyl hexyl, stearyl, hydroxyether and tertiary butylamino acrylates, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate and ethyl alpha-chloroacrylate, methyl alpha-bromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alphacyanoacrylate and ethyl alpha-cyanoacrylate; maleates; e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids, including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl beta-chloroethyl sulifde, vinyl beta-ethoxyethyl sulfide and the like can also be included. Diolefinically unsaturated hydrocarbons containing two olefinic groups in conjugated relation and the halogen derivates thereof, e.g., butadiene 1,3; 2-methyl-butadiene-1,3; 2,3-dimethyl-butadiene-1,3; 2-methyl-butadiene-1,3; 2,3-dimethyl-butadiene-1,3; 2-chloro-butadiene-1,3; 2-chloro-butadiene-1,3; 2,3-dichloro-butadiene-1,3; and 2-bromobutadiene-1,3 and the like.

Specific monomer compositions for forming copolymer can be illustrated by vinyl chloride and/or vinylidene chloride and vinyl acetate, vinyl chloride and/or vinylidene chloride and maleic or fumaric acid esters, vinyl chloride and acrylate or methacrylate ester, vinyl chloride and/or vinylidene chloride and vinyl alkyl ether. These are given as illustrative of the numerous combinations of monomers possible for the formation of copolymers. The present invention includes all such combinations.

The polymerization products of the present invention can be admixed during reaction to form the terpolymers of the invention with various conventional inert additives such as fillers, dyes, and pigments. In addition, the terpolymers of the invention can be admixed with plasticizers, lubricants, thermal stabilizers and ultraviolet light stabilizers as desired, either during the reaction to form the graft copolymer or subsequent thereto.

The molecular weight of the polymers of the invention is comparable to that of polymers presently commerically produced which ranges from 30,000 to about 2000,000 by the weight average method.

In order to determine grafting, samples of the terpolymer of the invention were ground to a fineness of between 20 to about 30 mesh and extracted in a solution of cyclohexane and tetrahydrofuran made up in a proportion of 90 parts cyclohexane to 10 parts of tetrahydrofuran on a volume basis. The extraction was done at a temperature of about 60° to about 70° centigrade for a period of about 2 hours, keeping the mixture under agitation throughout this period. By this process, it would be expected that the stabilizer, unreacted monomers and ungrafted copolymer would be extracted. The insoluble part would consist of the graft polymer and polyvinyl halide backbone.

In order to illustrate the improved processability and lowered melt viscosity of the terpolymers of the invention, the terpolymer products of the invention were evaluated for flow and film clarity by pressing the powdery product at 160° centigrade using a pressure of 6,000 pounds per square inch for a period of one minute. The following examples are given in order to further illustrate the invention. It is not intended that the invention be interpreted as being limited thereto. In the specification and claims, all parts and percentages are by weight, all pressures are gauge pressures and all temperatures are in degrees centigrade unless otherwise specified.

EXAMPLE 1

A vinyl chloride graft terpolymer was prepared by the following procedure: A Brabender Plasticorder was set to operate at 175° centigrade and 75 revolutions per minute. Flfty grams of a polyvinyl chloride homopolymer sold under the trademark "RUCON B-22", by the Ruco Chemical Division of Hooker Chemical Corporation, were added to the Brabender mixing chamber together with 1.5 grams of a tin stabilizer sold under the trademark of "M and T 831" by M and T Chemicals Incorporated, 5 grams of vinyl stearate, and 1.6 grams of maleic anhydride. After the above ingredients were thoroughly mixed and in a state of flux, 0.07 grams of tertiary butyl perbenzoate was added and the ingredients further mixed for a period of 10 minutes. The reaction mixture was then discharged to yield 58 grams of product.

The reaction product obtained was dissolved in a volumetric mixture of 90 parts cyclohexane and 10 parts tetrahydrofuran at a temperature of 60 to 70 degrees centigrade over a period of 2 hours while stirring. The tin stabilizer was extracted by this procedure, together with any ungrafted copolymer of vinyl stearate and maleic anhhydride and unreacted monomers. The insoluble portion obtained showed an add-on of 10.6 percent of vinyl stearate-maleic anhydride copolymer. The add-on is calculated from the following equation:

$$\text{Add-on}(\%) = \frac{\text{Graft Polyvinyl Chloride} - \text{Polyvinyl Chloride}}{\text{Polyvinyl Chloride}} \times 100$$

It was found that 81.1 percent of the monomers used were converted to copolymer and all the copolymer formed was grafted onto the polyvinyl chloride backbone. The insoluble portion obtained from the above extraction procedure was evaluated for flow properties and clarity by the following procedure: The powdery reaction product was pressed at 150° centigrade and 6,000 pounds per square inch for a period of 1 minute. A water clear to slightly hazy film was obtained. This film compares favorably with a film prepared from the "RUCON B-22" polymer which showed, after pressing under the same conditions, a film having a considerable number of hazy cracks.

EXAMPLE 2

A vinyl chloride graft terpolymer was prepared by the following procedure: Into the mixing chamber of a Brabender Plasticorder set for 170° centigrade and 75 revolutions per minute were added 50 grams of a polyvinyl chloride homopolymer, sold under the trademark "RUCON B-22" by the Ruco Division of the Hooker Chemical Corporation, 1.5 grams of a tin stabilizer, sold under the trademark "M and T 831" by M & T Corporation, 2.5 grams of vinyl laurate, and 1.1 grams of maleic anhydride. These ingredients were mixed until fluxing occurs and then 0.05 grams of tertiary butyl perbenzoate was added and mixing continued for a period of 10 minutes. A yield of 55 grams of product was obtained.

The product was ground to a 20 to 30 mesh powder and extracted by the procedure of Example 1. After removal of the tin stabilizer, unreacted monomers, and ungrafted copolymers by the extraction procedure of Example 1, the insoluble part obtained showed a 6.7 percent add-on of vinyl laurate-maleic anhydride copolymer having a polyvinyl chloride backbone as calculated by the add-on relationship shown in Example 1.

Flow properties were compared by pressing the insoluble powdery product at a temperature of 160° centigrade and 6,000 pounds per square inch for 1 minute. The resulting film was a transparent to slightly hazy film. The size of the film produced from a given amount of powder is an indication of the flow properties of the terpolymer. Comparison with a film formed under similar pressing conditions using the "RUCON B-22" as a starting material indicates that the terpolymer of the invention has about 1.5 times better flow properties as compared to "RUCON B-22".

EXAMPLE 3

Using the same proportions of ingredients as shown in Example 2 but substituting 0.05 grams of 2-t-butylazo-2,4-dimethoxy-4-methylpentane for tertiary butyl perbenzoate, a graft terpolymer was prepared.

Various modifications can be made in the invention without departing from the spirit thereof. Therefore, the foregoing specification is intended to illustrate the invention but not to limit it.

I claim:

1. A process for producing a graft copolymer composition comprising grafting a monomeric vinyl ester and maleic anhydride onto a vinyl halide polymer comprising at least 50 percent by weight of vinyl halide, in the presence of a free radical initiator at a temperature of about 150° to about 180° centigrade.

2. The process of claim 1 wherein said vinyl halide polymer is vinyl halide homopolymer.

3. The process of claim 2 wherein said vinyl ester and maleic anhydride are present in a proportion of about 3 to about 30 percent by weight based upon the weight of said polyvinyl halide.

4. The process of claim 3 wherein said vinyl ester and said maleic anhydride are present in a molar ratio of maleic anhydride to vinyl ester of about 0.1 to about 1.

5. The process of claim 4 wherein said vinyl ester has 6 to about 18 carbon atoms in the ester group.

6. The process of claim 5 wherein said polyvinyl halide is polyvinyl chloride and said vinyl ester is vinyl stearate.

7. The process of claim 1 wherein said free radical initiator is present in a proportion of from about 0.01 to about 1 part per 100 parts of said vinyl halide polymer and wherein said initiator has a half life of from about 5 minutes to about 5 hours at a temperature of about 150° centigrade to about 180° centigrade.

8. The process of claim 7 wherein said free radical initiator is selected from the group consisting of tertiary butyl perbenzoate, dicumyl peroxide, ditertiary butyl peroxide and 2 tertiary butylazo 2,4-dimethoxy-4-methyl pentane.

9. A process for producing a vinyl halide graft terpolymer which comprises introducing a vinyl halide homopolymer, monomeric vinyl ester having 6 to 18 carbon atoms in the ester group, maleic anhydride and a free radical initiator into a mixing zone and reacting the components at a temperature of about 150 to about 180 degress centigrade until said terpolymer is produced.

10. The process of claim 9 wherein said reaction takes place over a period of time from about 5 minutes to about 30 minutes after the addition of said free radical initiator.

11. A graft copolymer of a vinyl halide polymer substrate having a vinyl ester-maleic anhydride copolymer grafted thereon, wherein said ester and anhydride are polymerized in a proportion of about 3 to about 30 percent by weight of said vinyl halide polymer, and wherein said vinyl halide polymer comprises at least 50 percent by weight of vinyl halide.

12. The graft copolymer of claim 11 wherein the vinyl halide polymer is halide homopolymer.

13. The graft copolymer of claim 12 wherein said ester has 6 to about 18 carbon atoms in the ester group.

14. The graft copolymer of claim 13 wherein said polyvinyl halide is polyvinyl chloride and said ester is vinyl stearate.

* * * * *